May 2, 1944.  D. G. BRANDT  2,347,810
PROCESS AND APPARATUS FOR SEPARATING WAX
FROM MINERAL OIL SOLUTIONS
Filed Feb. 20, 1941
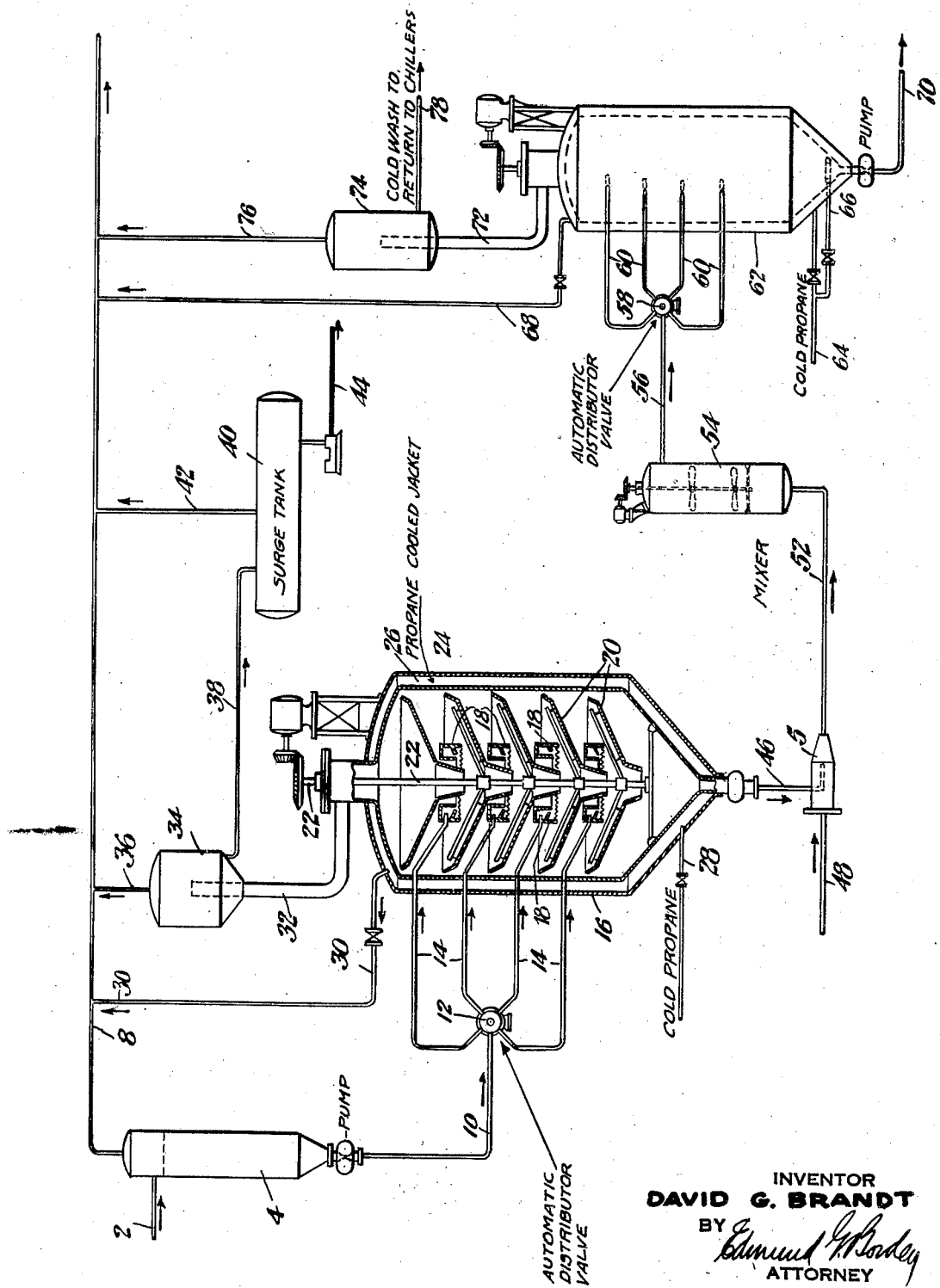
INVENTOR
DAVID G. BRANDT
BY
ATTORNEY Patented May 2, 1944

2,347,810

UNITED STATES PATENT OFFICE 2,347,810

PROCESS AND APPARATUS FOR SEPARATING WAX FROM MINERAL OIL SOLUTIONS

David G. Brandt, Westfield, N. J., assignor to Cities Service Oil Company, New York, N. Y., a corporation of Pennsylvania Application February 20, 1941, Serial No. 379,776

14 Claims. (Cl. 196—18)

This invention relates to process and apparatus for separating solid or crystallized wax from cold mineral oil solutions in which the wax content of the oil has been precipitated out to the desired extent by chilling.

The separation of precipitated or crystallized wax from solutions containing the same is effected in general either by settling, centrifuging, or filtration. The two latter procedures involve the installation of relatively expensive and elaborate equipment compared to the quantity of oil solution handled, and therefore it is desirable where possible to effect the separation of the crystallized wax from the solution in which it exists by a settling operation.

All crystallized petroleum waxes as far as known are of higher specific gravity than the liquid oil from which they are to be separated, and this difference in specific gravity is increased by diluting the oil with such solvents as propane, butane, naphtha or mixtures of these materials with each other, or similar hydrocarbons. The same is true for many other solvents. Therefore, except in unusual cases, a precipitated wax can be settled and thereby separated from the solution in which it is obtained by chilling.

The primary object of the present invention is to provide an improved process and apparatus by which precipitated or crystallized wax contained in the oil solution in which it exists may be successively separated therefrom by a settling procedure.

The process and apparatus of the present invention are in part disclosed in the applicant's prior applications Serial No. 670,066, filed May 9, 1933, for "Art of dewaxing oils," now Patent No. 2,303,721, granted December 1, 1942; Serial No. 207,231, filed May 11, 1938, for "Process and apparatus for dewaxing petroleum oils," now Patent No. 2,265,139, granted December 9, 1941; and Serial No. 370,941, filed December 20, 1940, for "Method for dewaxing oils."

The first mentioned application discloses a "propane" dewaxing process in which the chilled diluted stock containing the precipitated wax is distributed onto the trays in a multiple tray wax settler which is disclosed as being provided with a central rotary shaft with sweeps mounted thereon for moving settled wax on the trays toward the center of the chamber where it passes downwardly through central openings in the trays. The settler has a conical bottom and the wax is collected therein and removed by means of a gear pump. The wax-free oil solution passes around the periphery of the trays and upward in the chamber to the top, from which it is discharged. The settler disclosed in this application is a vertical jacketed chamber cooled and held at a low temperature by the evaporation of propane in the jacket.

Application Serial No. 207,231 discloses a "propane" dewaxing process and apparatus in which the extremely cold propane-oil mixture containing the crystallized wax is passed into a settling chamber in which the wax is settled out and passed as a slurry into a wax washing chamber and settler where the wax is washed with a cold propane mixture. From this wax washing chamber and settler, the wax is again conducted into a mixer where it is mixed with a substantial proportion of cold propane and then passed into a second wax washer and settler. The cold solution from the latter settler is mixed with the wax slurry from the first wax settling chamber and passed therewith into the first wax washing and settling chamber. The cold dilute wash liquid is removed from the first wax washing chamber and settler while the washed wax is removed from the last washing chamber. This application states that all of these chambers are of the same construction as the wax settler of application Serial No. 670,066.

Application Serial No. 370,941 discloses the use of wax settlers of the type described in application Serial No. 670,066, but which are used in accordance with a different procedure for the separation of crystallized wax from a cold oil solution in propane. According to the procedure described in this application, a mixture of oil, propane and crystallized wax at a temperature of about minus 60° F. is conducted into the upper part of an accumulator. The mixture to be settled is continuously withdrawn from the bottom of the accumulator and conveyed by means of a gear pump into a distributor valve mechanism which distributes the mixture alternately and successively through a plurality of feed lines which discharge at different levels onto trays in a multiple tray settling chamber of the type described in application Serial No. 670,066. The trays of this settling chamber slope toward the center and are of such a size that a free space is left between their outer edges and the inside wall of the chamber for the passage of separated oil solution. Provision is made for introducing oil mixture containing the solid wax particles above each tray except the upper tray and near the center of the chamber, so that the spaces between adjacent trays comprise more or less individual settling compartments or zones.

In accordance with the procedure described in application Serial No. 370,941, the distributor valve referred to is operated so that the oil mixture is introduced from one of the lines into a compartment between two trays in the settling chamber, no mixture being allowed to flow through the remaining lines. After a definite period has elapsed the valve mechanism directs the oil mixture to the different lines in turn which discharge into different compartments of the settling chamber. The oil solution separated out in the settling chamber is discharged through a relatively large-diameter vertical pipe which provides a substantial hydrostatic head of liquid in the chamber and thus prevents vaporization of propane therein. The oil solution overflows from the vertical discharge line into a small chamber and then through a line into a storage tank from which the cold solution is discharged by means of a pump.

In accordance with the further disclosure of application Serial No. 370,941, the wax slurry produced in the settling chamber is removed, mixed with extremely cold liquid propane in a nozzle, and then by a mechanical mixer after which the slurry and cold propane is passed through a distributor valve mechanism like that described above, into a wax washing chamber preferably of the same type and construction as the wax settling chamber. The wax slurry is washed with additional propane introduced into the bottom of the wax washing chamber and the washed wax and wash liquid are separately discharged from the chamber, the latter through a vertical hydrostatic head line. The wax settling and washing chambers are jacketed and cooled by evaporation of propane in the jacket.

The process and apparatus of the present invention are substantially described in application Serial No. 370,941, and comprise an improvement in the art of separating solids from fluid mixtures which contain the solid in suspended crystalline or precipitated form, such as wax in a cold oil solution.

The advantages of the process and apparatus of the present invention will be apparent to those skilled in the art from the following more detailed description thereof, taken in connection with the accompanying drawing in which the single figure is a diagrammatic flow sheet showing an apparatus arrangement which is particularly adapted for carrying out the improved process. In the figure, certain elements are shown in elevation and in broken section.

The diluted oil mixture containing solid wax particles and produced by any acceptable procedure in which the solid wax particles are formed by the chilling of a solution of the oil to be dewaxed in a solvent for the oil, is conducted through a line 2, for example, at a temperature of approximately minus 60° F. into an accumulator chamber 4 which is used as a supply chamber for supplying the cold mixture to the settling equipment. The process and apparatus of the present invention may be illustrated by describing the same in connection with a specific example in which the oil mixture conducted through the line 2 contains solid particles of wax suspended in a solution of lubricating oil stock in liquid propane. At a temperature of minus 60° F. a pressure of about ten pounds per square inch absolute will be maintained in the chamber 4, as for example, by connecting the chamber through a vent line 6 with a suction line 8 used for collecting propane vented at different points in the system of apparatus.

The oil-wax mixture to be settled in accordance with the process of the present invention is withdrawn continuously from the accumulator 4 through a line 10 and conveyed by means of a pump such as a gear pump therein, into a distributor mechanism 12 which is preferably automatic in operation. The mixture is alternately distributed by the distributor 12 through a plurality of lines 14, into a jacketed multiple-tray settling chamber 16 at different levels therein, or into different settling compartments between adjacent trays. The wax mixture conducted through any one of the lines 14 is discharged near the center of the chamber beneath a tray by means of an annular spreader 18 having a ring structure substantially as shown, so that the line 14 discharges the mixture at a tangent into the ring which has a serrated outer edge for diffusing the mixture into the spaces between adjacent trays in the chamber. The annular spreader rings 18 as shown are inverted channels provided with a baffle plate which leaves a relatively narrow annular opening for the oil-wax mixture to pass through, and thereby be distributed from the whole circumference of the ring.

The settling chamber 16 is provided with a plurality of vertically spaced funnel-shaped trays 20 provided with central downwardly extending discharge passages, and mounted in the chamber so that their outer circumferences are slightly spaced from the inside wall of the chamber. For simplicity, the mounting means are not shown. The settling chamber is also provided with a central rotary shaft 22 extending through the central passages in the trays, on which sweeps 24 are mounted for scraping settled wax toward the center of the chamber into the tray openings or passages. The shaft 22 is rotated at a relatively slow predetermined speed by a gear mechanism and motor mounted at the top of the chamber as shown. The settling chamber 16 is completely jacketed as shown, the jacket space 26 being supplied with liquid propane from a supply line 28, while propane vapor is discharged through a valved line 30 into the suction line 8. The settling chamber is also preferably insulated.

In operating the distributor valve mechanism 12, which may be of usual rotary plug type construction provided with one inlet line and any desired number of outlet lines, and preferably including motor and timing means, it is intended that the oil mixture be supplied through only one of the lines 14 at a time. This will permit complete settling of the wax in the compartments supplied by the other lines before such compartments are again charged with the oil-wax mixture. A definite period of settling may be decided upon for each compartment so that the distributor mechanism 12 is operated accordingly, the structure and operation of the distributor being preferably arranged to taper off the supply of oil-wax mixture to one compartment while the supply to the next compartment is brought up gradually. It will be appreciated that as the mixture commences to enter any one of the compartments through the spreader 18, the relatively clear wax-free oil therein will be replaced as fast as the mixture is supplied, and be forced around the periphery of the tray next above and will flow into the upper part of the chamber. At the same time, the sweeps 24 continually bring the settled wax toward the center of the chamber where it settles down through the central passages in the trays and collects in the conical bottom of the chamber. Each passage except the lowest discharges directly into the next lower passage.

The wax-free oil collected in the upper part of the chamber 16 is withdrawn through a relatively large diameter vertical discharge line 32 which overflows into a chamber 34, the upper end of the line 32 being at a slightly lower level than the level of the oil mixture maintained in the accumulator 4. The line 32 is preferably long enough to provide a substantial hydrostatic head of liquid in the chamber 16, which will aid in preventing vaporization of propane and consequent agitation of the oil mixture therein. The chamber 34 is vented through a line 36 into the suction line 8 so that any propane vapor may be removed and pressure equilibrium maintained between chambers 4 and 34. The separated cold oil solution free of wax is conducted from the chamber 34 through a line 38 into a storage tank 40 which is vented to the line 8 by means of a line 42. The cold oil solution is discharged from the storage tank 40 for use as a heat exchange medium or for further processing through a line 44 by means of a pump mounted therein.

The wax slurry collected in the bottom of the settling chamber 16 is removed through a line 46 by means of a gear pump therein and mixed with extremely cold propane from a line 48 in a nozzle 50 in which the wax slurry is discharged into a surrounding body of cold propane. The resulting diluted mixture is conducted from the nozzle 50 through a line 52 into a mechanical mixer 54 where a thorough mixing of the propane and wax is secured by a blade mixer of the type shown. Sufficient propane is introduced through line 48 to substantially dilute the slurry and wash the wax crystals. This diluted mixture is conducted from the upper part of the mixer 54 through a line 56 into a distributor 58 of the same type as the distributor 12. The valve 58 distributes the wax-propane mixture alternately into a plurality of lines 60 which discharge into a wax settling chamber 62 which is preferably of the same construction and operated in the same manner as the settling chamber 16.

In the operation of the wax washing and settling chamber 62 cold propane is introduced into the jacket from a line 64 and also directly into the conical bottom of the chamber from a valved line 66 for the purpose of displacing any oil solution in the wax slurry as it settles into the bottom of the chamber. Propane vapor formed in the jacket of chamber 62 is vented through a valved line 68 into the suction line 8 as desired, in order to maintain the chamber 62 at the desired low temperature, for example, minus 60° F. The wax slurry in the chamber 62 is removed through a line 70 in which is provided a gear pump as shown. The wax slurry may be conducted to a still for the recovery of propane.

The dilute propane-wax washings containing a small percentage of oil collects in the upper part of the chamber 62 and is removed through a vertical line 72 into an overflow chamber 74 which is vented to the line 8 through a line 76. The upper end of vertical line 72 is somewhat lower than that of line 32, the difference being sufficient to substantially provide for gravity flow of materials from the chamber 16 into the chamber 74. The cold propane solution in the chamber 74 is discharged through a line 78 and may be used as a cooling medium at some point in the chilling operation for producing the oil-wax mixture in the line 2.

While the process and apparatus of the present invention has been described in connection with the separation of wax from a refrigerated propane-oil mixture containing the wax in suspension, it is to be understood that substantially the same apparatus and procedure may be employed where other solvents or diluents are used or where other solids are to be separated from liquids. Various other changes may be made in the process and apparatus without departing from the spirit and scope of the invention as defined by the accompanying claims.

Having thus described the invention in its preferred form, what is claimed as new is:

1. In a process for dewaxing mineral oil stock in which a cold mixture of mineral oil and diluent is produced containing wax in the form of substantially distinct separable particles, the improvement in the separation of the wax particles from the mixture which comprises continuously passing a stream of the oil mixture into a relatively large settling chamber provided with a plurality of vertically arranged interconnected settling zones, directing the stream of the oil mixture intermittently and alternately into each of said zones for a predetermined period of time, delivering the stream of oil mixture into each zone in such a manner as to substantially avoid disturbing the oil mixture being settled in other zones in the chamber, collecting the wax settled out in each zone in the lower portion of the chamber, collecting dewaxed oil from each zone in the upper portion of the chamber, and separately removing dewaxed oil and the settled wax from the chamber.

2. The process for dewaxing mineral oil stock as defined by claim 1 in which the stream of oil mixture introduced into each zone is distributed into the central portion thereof in such a way as to gradually displace the oil solution previously introduced thereinto and from which the wax has been settled.

3. The process for dewaxing mineral oil stock as defined by claim 1 in which the wax precipitated in each zone is moved toward the center of such zone and in which the dewaxed oil in the zone being supplied with oil mixture is displaced toward the periphery of the zone.

4. In a process for dewaxing mineral oil stock in which a cold mixture of mineral oil and diluent is produced containing wax in suspension in the cold mixture, the improvement in the separation of the wax suspension from the mixture, which comprises introducing oil mixture intermittently, alternately and successively into a plurality of interconnected settling zones which are maintained filled with the materials of the oil mixture during the operation, supplying oil mixture containing wax in suspension to each zone for a predetermined period of time, the oil mixture being introduced into each zone in such a manner as to displace dewaxed oil therein, collecting the wax settled out in each zone and collecting the dewaxed oil from all of the zones.

5. The process of separating solid particles from a suspension of such solid particles contained in a liquid in which the solid is of higher specific gravity than the liquid, which comprises passing a stream of liquid in suspension into a relatively large settling chamber provided with a plurality of interconnected settling zones, directing the stream of liquid suspension successively and alternately into the plurality of zones and introducing it into each of said zones for a predetermined period of time, thereby permitting substantially undisturbed settling of the solid material in the zones during the time they are not being supplied with liquid suspension, collecting the solid material settled out in each zone in the lower portion of the chamber, collecting the liquid free of solid material from each zone in the upper portion of the chamber, and separately removing the solid material and liquid from the chamber.

6. The process of dewaxing mineral oil stock as defined by claim 4 in which the diluent is a liquid normally gaseous hydrocarbon and in which the said zones are maintained under a hydrostatic pressure imposed by a substantial column of liquid.

7. In an apparatus for separating wax from a cold mixture of oil, diluent and wax, in which the wax is present in the form of undissolved particles, the improved system for effecting the separation of the wax particles from the mixture comprising a large vertical settling chamber provided with a number of vertically spaced trays, a scraper for each tray to remove settled wax therefrom, means for conducting a stream of the cold mixture into the spaces between adjacent trays, means for controlling the delivery of said stream adapted to direct the delivery of said stream alternately and successively into the series of spaces between adjacent trays, and means for separately discharging wax and dewaxed oil solution from the settling chamber.

8. An apparatus as defined by claim 7 in which the means for discharging dewaxed oil solution from the settling chamber includes a substantial length of conduit arranged to provide a substantial hydrostatic head of liquid on said chamber.

9. An apparatus for separating wax as defined by claim 7 in which said trays are provided with central openings and said scrapers are arranged to move settled wax into said openings, the structure of said trays being such that the wax from each tray is delivered into the central opening in the next lower tray.

10. An apparatus for recovering substantially oil-free wax from a cold mixture of oil, diluent and precipitated wax in suspension therein, comprising an enlarged settling chamber provided with a plurality of interconnected compartments, means for conducting a stream of cold mixture alternately into the compartments in succession, means for separately discharging settled wax slurry and dewaxed oil solution from said chamber, means for mixing cold diluent with said wax slurry to wash occluded oil from the particles of wax thereof, and a second settling chamber for separating the wax of said slurry from the dilute oil solution formed by adding diluent thereto.

11. An apparatus for separating solid particles from a suspension of such particles in a liquid in which the solid particles are of higher specific gravity than that of the liquid, comprising an enlarged settling chamber provided with a number of vertically spaced trays, a scraper for each tray adapted to remove settled solid material therefrom, means for conducting a stream of the liquid suspension into the spaces between adjacent trays, means for controlling the delivery of said stream into said spaces adapted to direct the delivery of the stream alternately and successively into the series of spaces between adjacent trays, and means for separately discharging settled solid material and liquid free of such material from the settling chamber.

12. An apparatus as defined by claim 11 in which said trays are flat funnel-shaped and provided with central openings, and in which said scrapers are adapted to move settled solid material from the tray surfaces into said openings.

13. An apparatus for separating solid particles from a suspension of such particles in a liquid in which the solid particles are of higher specific gravity than that of the liquid, comprising an enlarged settling chamber provided with a number of vertically spaced relatively flat funnel-shaped trays, said trays being provided with central openings and being spaced from the side wall of said chamber, a scraper for each tray adapted to remove settled solid material therefrom, means for conducting a stream of the liquid suspension into the spaces between adjacent trays, means for controlling the delivery of said stream into said spaces adapted to direct the stream intermittently and alternately into the series of spaces between adjacent trays, means for conducting solid-free liquid from the spaces between said trays and from the settling chamber, and separate means for discharging settled solid material from the bottom of the chamber.

14. An apparatus as defined by claim 11 in which said controlling means comprises a valve type mechanism adapted to receive a continuous stream of liquid mixture and deliver said stream for successive periods of time into each of a plurality of conduits leading respectively to the spaces between the adjacent trays in said chamber.

DAVID G. BRANDT.